LE CLAIRE J. OWEN.
ANTIROOTING DEVICE FOR ANIMALS.
APPLICATION FILED JUNE 20, 1908.
931,794.
Patented Aug. 24, 1909.
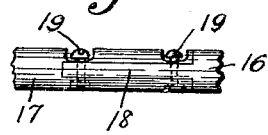
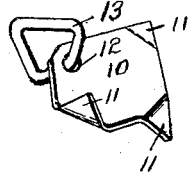
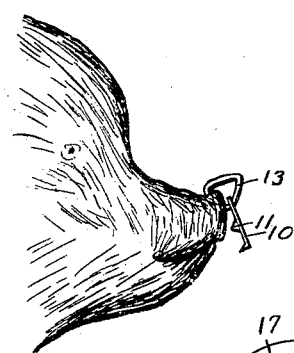
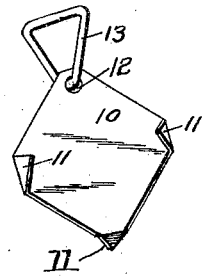
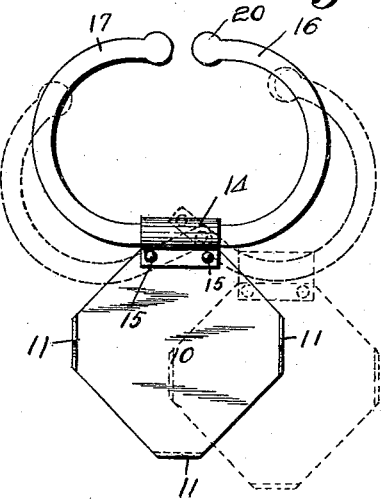

UNITED STATES PATENT OFFICE.

LE CLAIRE J. OWEN, OF ROCKWELL CITY, IOWA.

ANTIROOTING DEVICE FOR ANIMALS.

931,794.   Specification of Letters Patent.   Patented Aug. 24, 1909.

Application filed June 20, 1908. Serial No. 439,557.

*To all whom it may concern:*

Be it known that I, LE CLAIRE J. OWEN, a citizen of the United States, residing at Rockwell City, in the county of Calhoun and State of Iowa, have invented a certain new and useful Antirooting Device for Animals, of which the following is a specification.

The object of my invention is to provide a device of simple, durable and inexpensive construction that may be quickly and easily applied to the nose of an animal in such a manner that when the animal attempts to root with its nose the device will cause the sharp points carried thereby to prick the animal's nose and thus effectively prevent rooting.

My invention consists in the construction, arrangement and combination of the various parts of the device, whereby the objects contemplated are attained as hereinafter more fully set forth, pointed out in my claims, and illustrated in the accompanying drawings, in which—

Figure 1 shows a side elevation of a hog's nose with one of my improved anti-rooting devices applied thereto as in use. Fig. 2 shows a detail, perspective view of the anti-rooting device detached. Fig. 3 shows a detail plan view of a modified form of the anti-rooting device adapted to be attached to such animals as calves. The dotted lines show the ring in its open position. Fig. 4 shows an enlarged detail view illustrating the joint in the ring shown in Fig. 3 and—Fig. 5 shows a modified form of the device illustrated in Fig. 2.

Referring to the accompanying drawings, the device is seen to be composed of a flat metal plate 10, preferably rectangular in outline and having three of its corners bent at right-angles to form three sharpened projections 11 all extending from the same direction. At the remaining corner of the plate is a round opening 12 into which a separable ring 13 is inserted. This ring is designed to be passed through the end of the hog's snout in the ordinary manner in which rings of this kind are usually attached, to thereby permanently connect the device with the animal's snout. When so attached, the plate 10 will lie adjacent to the end of the hog's snout with the pointed projections extending toward the snout. The plate is of such size and shape that it will not in any way interfere with the hog's eating in the ordinary way, however, when the animal attempts to root in the ground or to rub its snout against any other object the effect will be to force the pointed projections 11 into the end of its snout to thereby effectively prevent further rooting.

In the modified form of my invention illustrated in Figs. 3 and 4, I have shown a device especially adapted for attachment to animals such as calves. In this case, the plate and its projections are the same as in my preferred form, however, I attach to the plate a metal sleeve 14 which is detachably connected with the plate by means of the bolts 15. In this sleeve, I have inserted the two semi-circular ring members 16 and 17. The part 16 has at one end a tongue 18 and the part 17 has at one end a slot designed to receive said tongue, and these parts are connected at the joint by means of the bolts 19. The parts 16 and 18 are provided at their ends with rounded knobs 20. In use with this portion of the device, the ring is first placed in position in the animal's nose and the rounded knobs 20 are brought together on opposite sides of the partition between the animal's nostrils, and the ring is firmly held in such position by the bolts 19. Then the sleeve 14 is placed over the ring as shown in Fig. 3 and bolted to the plate 10 by the bolts 15, and when this is done obviously the attachment will be permanently connected with the animal's nose. This form of the device is especially adapted for use on calves to prevent them from sucking.

The modified form shown in Fig. 5 has a projection on its outer face in addition to the projections on its inner face, so that if the plate should happen to be inclined upwardly over the top of the animal's nose the single point would press against the animal's nose and prevent rooting.

I claim as my invention.

1. In a device of the class described, the combination of a two part ring, said parts being pivotally connected with each other, means for rigidly securing said parts together, a plate having projections on one side, and a sleeve secured to one end of the plate with its longitudinal axis parallel with the plate, said sleeve having the connected ends of the ring members inserted therein and assisting to prevent the parts of the ring from moving at their pivotal connection when in the sleeve, said sleeve serving to pivotally connect the plate with the ring so that it may swing in a plane at right-angles to the ring.

2. In a device of the class described, the combination of a ring designed to be attached to an animal's snout and a plate connected to the ring and capable of swinging to position in front of the end of the animal's snout and also backwardly over the top of the animal's snout, said plate having a sharpened projection on each side, that on one side being designed to engage the end of the animal's snout and that on the other side being designed to engage the top of the animal's snout when said plate is pressed upon at the time it is in position at either limit of its movement.

Des Moines, Iowa, June 11, 1908.

LE CLAIRE J. OWEN.

Witnesses:
E. C. STEVENSON,
C. E. STEVENSON.